(12) United States Patent
Nakatani et al.

(10) Patent No.: US 8,666,640 B2
(45) Date of Patent: Mar. 4, 2014

(54) CONTROL APPARATUS AND CONTROL METHOD FOR INTERNAL COMBUSTION ENGINE

(75) Inventors: Koichiro Nakatani, Mishima (JP); Terutoshi Tomoda, Mishima (JP); Shinobu Ishiyama, Numazu (JP); Michio Furuhashi, Numazu (JP); Tomoyuki Ono, Sunto-gun (JP); Tomoyuki Kogo, Gotenba (JP); Yoshihiro Hisataka, Fujinomiya (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 389 days.

(21) Appl. No.: 12/671,360

(22) PCT Filed: Aug. 6, 2008

(86) PCT No.: PCT/IB2008/002070
§ 371 (c)(1),
(2), (4) Date: Jan. 29, 2010

(87) PCT Pub. No.: WO2009/019578
PCT Pub. Date: Feb. 12, 2009

(65) Prior Publication Data
US 2010/0204907 A1     Aug. 12, 2010

(30) Foreign Application Priority Data
Aug. 9, 2007  (JP) .................. 2007-208484

(51) Int. Cl.
B60T 7/12     (2006.01)
G05D 1/00     (2006.01)
G06F 7/00     (2006.01)
G06F 17/00    (2006.01)
F02B 47/08    (2006.01)
F02M 27/00    (2006.01)

(52) U.S. Cl.
USPC ...................... 701/108; 123/568.14

(58) Field of Classification Search
USPC ...................... 701/108; 123/568.14
See application file for complete search history.

(56) References Cited

U.S. PATENT DOCUMENTS 5,161,497 A  * 11/1992  Simko et al. ............... 123/90.15
6,792,924 B2 *  9/2004  Aoyama et al. .......... 123/568.14
7,299,775 B2   11/2007  Tateno et al.
(Continued)

FOREIGN PATENT DOCUMENTS

EP    0 643 201 A1    3/1995
EP    1 318 286 A2    6/2003
(Continued)

Primary Examiner — Stephen K Cronin
Assistant Examiner — Sherman Manley
(74) Attorney, Agent, or Firm — Sughrue Mion, PLLC (57) ABSTRACT

A control apparatus for an internal combustion engine includes phase change means (60) for advancing or retarding phases of an opening timing and a closing timing of an intake valve (62); duration change means (60) for increasing or decreasing a duration of the intake valve (62); and EGR gas amount increase means (50) for increasing an amount of EGR gas, based on an operating state of an internal combustion engine. The control apparatus further includes intake-valve closing timing advancing means (50) for advancing the intake-valve closing timing when the amount of EGR gas is increased. The intake-valve closing timing advancing means (50) advances the intake-valve closing timing by performing a first operation that advances the phases using the phase change means (60), and performing a second operation that decreases the duration using the duration change means (60), and makes a timing at which the second operation is started later than a timing at which the first operation is started.

13 Claims, 8 Drawing Sheets

(56) References Cited

U.S. PATENT DOCUMENTS

2005/0039723 A1 2/2005 Miura
2009/0217906 A1* 9/2009 Nishimoto et al. ........... 123/348

FOREIGN PATENT DOCUMENTS

| JP | 2002-089341 A | 3/2002 |
| WO | 2006/025565 A1 | 3/2006 |

* cited by examiner

CONTROL APPARATUS AND CONTROL METHOD FOR INTERNAL COMBUSTION ENGINE

BACKGROUND OF THE INVENTION

1. Field of the Invention

The invention relates to a control apparatus and a control method for an internal combustion engine. More specifically, the invention relates to a control apparatus and a control method for an internal combustion engine that includes a variable valve operating mechanism and an EGR system.

2. Description of the Related Art

Japanese Patent Application Publication No. 2002-89341 (JP-A-2002-89341) describes a control apparatus that integrally controls a variable valve operating mechanism and Exhaust Gas Recirculation (EGR). The control apparatus includes a duration change mechanism that increases or decreases a lift and a duration of an intake valve; and a phase change mechanism that advances or retards a phase of a center angle of the lift. The lift, the duration, the phase of the center angle of the lift, and the amount of exhaust gas returned to an intake system for an internal combustion engine (i.e., the amount of EGR gas) are integrally controlled by controlling the mechanisms, according to a rate of change in a load of the internal combustion engine. Thus, the control apparatus increases fuel efficiency by reducing pump loss, and reduces the amount of NOx when the internal combustion engine is in any operating state.

In the internal combustion engine that includes the EGR system, when the operating state of the vehicle is changed to a low load operating state, the amount of the EGR gas is increased to reduce the amount of discharged NOx. When a demand for increasing the amount of the EGR gas is made, values of various control parameters are controlled to appropriate values corresponding to a target amount of the EGR gas. More specifically, in the internal combustion engine that includes the variable valve operating mechanism, in order to increase the amount of internal EGR gas, an opening timing of an intake valve is advanced by a predetermined amount to increase a valve overlap period in which the intake valve and an exhaust valve are open. Also, in order to increase an actual compression ratio to a target value, a closing timing of the intake valve is advanced by a predetermined amount.

In the variable valve operating mechanism that changes the phase and the duration of the intake valve separately, it is possible to set an execution timing of the phase control, and an execution timing of the duration control, separately. Therefore, it is preferable to set valve timings to minimize the amount of discharged NOx. Particularly, when the response of the duration change mechanism to the control is different from the response of the phase change mechanism to the control, for example, when the response of the duration change mechanism to the control is faster than the response of the phase change mechanism to the control, it is necessary to take into account the responses. However, in the above-described system, the execution timings of the controls are not accurately controlled. Thus, the above-described system needs to be improved.

SUMMARY OF THE INVENTION

The invention provides a control apparatus and a control method for an internal combustion engine, which execute an appropriate valve timing control based on an amount of EGR gas, in an internal combustion engine that includes a variable valve operating mechanism and an EGR system.

A first aspect of the invention relates to a control apparatus for an internal combustion engine that includes phase change means for advancing or retarding phases of an opening timing and a closing timing of an intake valve; duration change means for increasing or decreasing a duration of the intake valve; and EGR gas amount increase means for increasing an amount of EGR gas, based on an operating state of an internal combustion engine. The control apparatus further includes intake-valve closing timing advancing means for advancing the closing timing of the intake valve when the amount of the EGR gas is increased. The intake-valve closing timing advancing means advances the closing timing of the intake valve by performing a first operation that advances the phases using the phase change means, and performing a second operation that decreases the duration using the duration change means. The intake-valve closing timing advancing means makes a timing at which the second operation is started later than a timing at which the first operation is started.

When a demand for increasing the amount of EGR gas for an internal combustion engine is made, the control that advances the closing timing of the intake valve (hereinafter, this control will be referred to as "intake-valve closing timing advancing control") is executed to increase an actual compression ratio. According to the first aspect, when the first operation that advances the phases, and the second operation that decreases the duration are performed in the intake-valve closing timing advancing control, the second operation is started after the first operation is started. Therefore, according to the first aspect, it is possible to avoid a situation where the actual compression ratio is increased during a transient period in the EGR gas amount increase control that increases the amount of the EGR gas, that is, a period in which the amount of the EGR gas is insufficient. Thus, it is possible to effectively suppress the amount of discharged NOx.

The EGR gas amount increase means may increase the amount of the EGR gas by advancing the opening timing of the intake valve. The intake-valve closing timing advancing means may make a timing at which the second operation is completed substantially match a timing at which the first operation is completed.

When the first operation that advances the phases is performed, not only the closing timing of the intake valve but also the opening timing of the intake valve is advanced. This increases the amount of internal EGR gas. According to the first aspect, the timing at which the second operation is completed substantially matches the timing at which the first operation is completed. Therefore, the timing at which the operation that increases the amount of the internal EGR gas is completed matches the timing at which the intake-valve closing timing advancing control is completed. This avoids the situation where the actual compression ratio is increased when the amount of the EGR gas is insufficient. Thus, it is possible to effectively suppress the amount of discharged NOx.

The duration change means may include an actuator whose response to a control is fast as compared to the phase change means.

According to the first aspect, the duration change means includes an actuator whose response to a control is fast as compared to the phase change means. Therefore, it is possible to effectively perform the second operation during a desired period in the intake-valve closing timing advancing control.

The duration change means may change the duration, while maintaining the opening timing of the intake valve at a substantially constant value.

According to the first aspect, by operating the duration change means, it is possible to change only the closing timing of the intake valve, without changing the opening timing of the intake valve. Thus, it is possible to adjust the opening timing of the intake valve using the phase change means, and to adjust the closing timing of the intake valve using both of the phase change means and the duration change means.

The intake-valve closing timing advancing means may perform a third operation that increases the duration using the duration change means, before the second operation is started.

According to the first aspect, the third operation that increases the duration is performed before the second operation is started in the intake-valve closing timing advancing control. Therefore, it is possible to further suppress an increase in the actual compression ratio in an early period during the intake-valve closing timing advancing control. Thus, it is possible to effectively reduce the amount of generated NOx in the period.

The EGR gas amount increase means may include an EGR passage that connects an exhaust passage for the internal combustion engine to an intake passage for the internal combustion engine, and external EGR gas amount increase means for increasing an amount of external EGR gas that is returned from the exhaust passage to the intake passage through the EGR passage. The intake-valve closing timing advancing means may start the second operation, based on the amount of the EGR gas.

According to the first aspect, when the amount of external EGR gas is increased according to the demand from the internal combustion engine, the second operation is started based on the amount of the EGR gas, in the intake-valve closing timing advancing control. This effectively avoids the situation where the actual compression ratio is excessively increased during the period in which the amount of the EGR gas is insufficient.

When a detected value or an estimated value of the amount of the EGR gas or an amount correlated with the amount of the EGR gas reaches a predetermined target value, the intake-valve closing timing advancing means may start the second operation.

According to the first aspect, when the amount of the external EGR gas is increased according to the demand from the internal combustion engine, the second operation in the intake-valve closing timing advancing control is started at the timing matching the timing at which the detected value or the estimated value of the amount of the EGR gas, the EGR rate, or an amount correlated with the amount of the EGR gas or the EGR rate reaches the target value. This effectively avoids the situation where the actual compression ratio is excessively increased during a transportation delay period in which the external EGR gas is not actually introduced into the cylinder, that is, the period in which the amount of the EGR gas is insufficient.

The control apparatus may further include pilot injection amount increase means for increasing a pilot injection amount during a period in which an amount by which the intake-valve closing timing is advanced by the intake-valve closing timing advancing means is smaller than a predetermined value.

According to the first aspect, the pilot injection amount is increased during the period in which the amount by which the closing timing of the intake valve is advanced is smaller than the predetermined value in the intake-valve closing timing advancing control. During the period in which the amount by which the closing timing of the intake valve is advanced is small, the actual compression ratio is low and the amount of the EGR gas is insufficient. Therefore, by increasing the pilot injection amount during the period, it is possible to effectively suppress generation of smoke and generation of HC.

The pilot injection amount increase means may increase the pilot injection amount during a period before the intake-valve closing timing advancing means starts the second operation.

According to the first aspect, the pilot injection amount is increased during the period before the second operation is started in the intake-valve closing timing advancing control. Before the second operation is started, the actual compression ratio is low, and the amount of the EGR gas is insufficient. Therefore, by increasing the pilot injection amount during the period, it is possible to effectively suppress generation of smoke and generation of HC.

A second aspect of the invention relates to a control method for an internal combustion engine that includes phase change means for advancing or retarding phases of an opening timing and a closing timing of an intake valve; duration change means for increasing or decreasing a duration of the intake valve; and EGR gas amount increase means for increasing an amount of EGR gas, based on an operating state of an internal combustion engine. The control method includes advancing the closing timing of the intake valve by performing a first operation that advances the phases using the phase change means, and performing a second operation that decreases the duration using the duration change means, when the amount of EGR gas is increased; and making a timing at which the second operation is started later than a timing at which the first operation is started.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the drawings. The same and corresponding elements in the drawings are denoted by the same reference numerals, and the description thereof will not be repeated. The invention is not limited to the embodiments described below.

First Embodiment

Configuration of the First Embodiment

Figure 1:
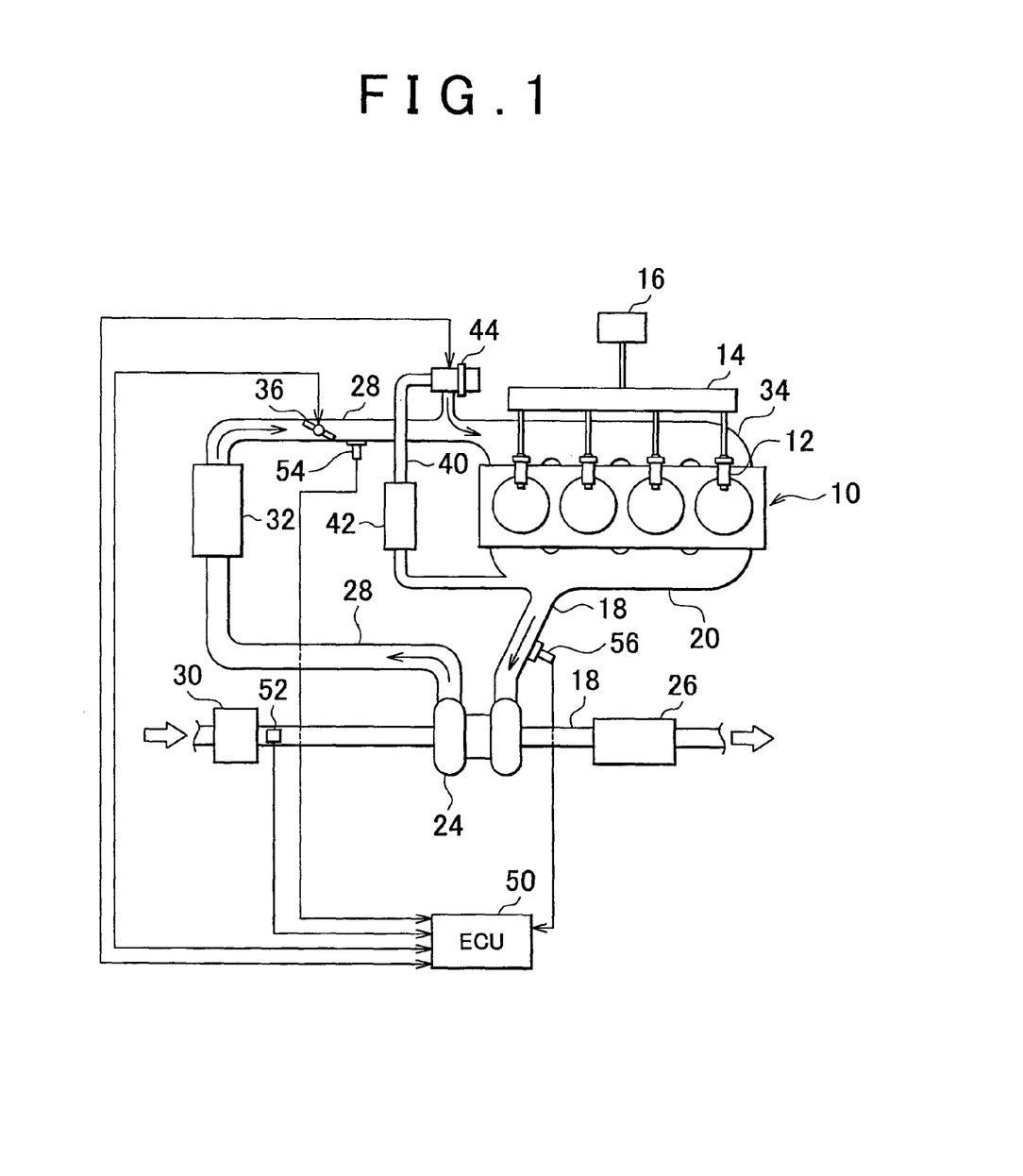
FIG. 1 is a diagram schematically showing a system according to a first embodiment of the invention.

FIG. 1 is a diagram schematically showing the configuration of an internal combustion engine system according to a first embodiment of the invention. As shown in FIG. 1, the system according to the first embodiment includes a four-cycle diesel engine 10 with a plurality of cylinders (four cylinders in FIG. 1) (hereinafter, the four-cycle diesel engine 10 will be simply referred to as "diesel engine 10"). The diesel engine 10 is provided in a vehicle, and used as a power source.

In the embodiment, the invention is applied to a control for the diesel engine (compression ignition internal combustion engine). However, the invention is not limited to the diesel engine. The invention may be applied to controls for a gasoline engine (spark ignition internal combustion engine), and other internal combustion engines.

An injector 12 is provided for each cylinder of the diesel engine 10 to inject fuel directly into the cylinder. The injectors 12 for the cylinders are connected to a common rail 14 that is common to the injectors 12. Fuel in a fuel tank (not shown) is pressurized to a predetermined fuel pressure by a supply pump 16, and then stored in the common rail 14. The fuel is supplied from the common rail 14 to the injectors 12.

An exhaust passage 18 for the diesel engine 10 is connected to an exhaust manifold 20 that has branch passages. The branch passages are connected to exhaust ports (not shown) of the respective cylinders. The exhaust passage 18 is connected to an exhaust turbine of a turbocharger 24. In the exhaust passage 18, an aftertreatment device 26, which purifies exhaust gas, is disposed downstream of the turbocharger 24. For example, an oxidation catalyst, a NOx catalyst, a Diesel Particulate Filter (DPF), and a Diesel Particulate-NOx-Reduction system (DPNR) may be used as the aftertreatment device 26.

An air cleaner 30 is provided close to an inlet of the intake passage 28 for the diesel engine 10. Air, which is taken through the air cleaner 30, is compressed by an intake air compressor of the turbocharger 24, and then cooled by an intercooler 32. After the intake air passes through the intercooler 32, the intake air is distributed to intake ports (not shown) of the cylinders through an intake manifold 34.

In the intake passage 28, an intake throttle valve 36 is provided at a position between the intercooler 32 and the intake manifold 34. Also, in the intake passage 28, an airflow meter 52, which detects an intake air amount, is provided downstream of, and close to the air cleaner 30.

One end of an Exhaust Gas Recirculation (EGR) passage 40 is connected to the intake passage 28 at a position close to the intake manifold 34. The other end of the EGR passage 40 is connected to the exhaust passage 18 at a position close to the exhaust manifold 20. In the system, part of exhaust gas (burned gas) can be returned to the intake passage 28 through the EGR passage 40, that is, an external EGR control can be executed. Hereinafter, the exhaust gas returned to the intake passage 28 through the EGR passage 40 will be referred to as "external EGR gas".

An EGR cooler 42, which cools the external EGR gas, is provided in the EGR passage 40. In the EGR passage 40, an EGR valve 44 is provided downstream of the EGR cooler 42. By changing an opening amount of the EGR valve 44, it is possible to adjust an amount of the exhaust gas that passes through the EGR passage 40, that is, an amount of the external EGR gas.

In the intake passage 28, an intake air pressure sensor 54, which detects an intake air pressure, is provided downstream of the intake throttle valve 36. In the exhaust passage 18, a back pressure sensor 56, which detects a back pressure, is provided upstream of the turbocharger 24.

As shown in FIG. 1, the system according to the first embodiment includes an Electronic Control Unit (ECU) 50. An input portion of the ECU 50 is connected to the airflow meter 52, the intake air pressure sensor 54, and the back pressure sensor 56 that are described above. In addition, the input portion of the ECU 50 is connected to other sensors used to control the diesel engine 50. An output portion of the ECU 50 is connected to the injectors 12, the intake throttle valve 36, and the EGR valve 44 that are described above. In addition, the output portion of the ECU 50 is connected to other actuators used to control the diesel engine 10. The ECU 50 drives devices according to predetermined programs, based on information input to the ECU 50.

Figure 2:
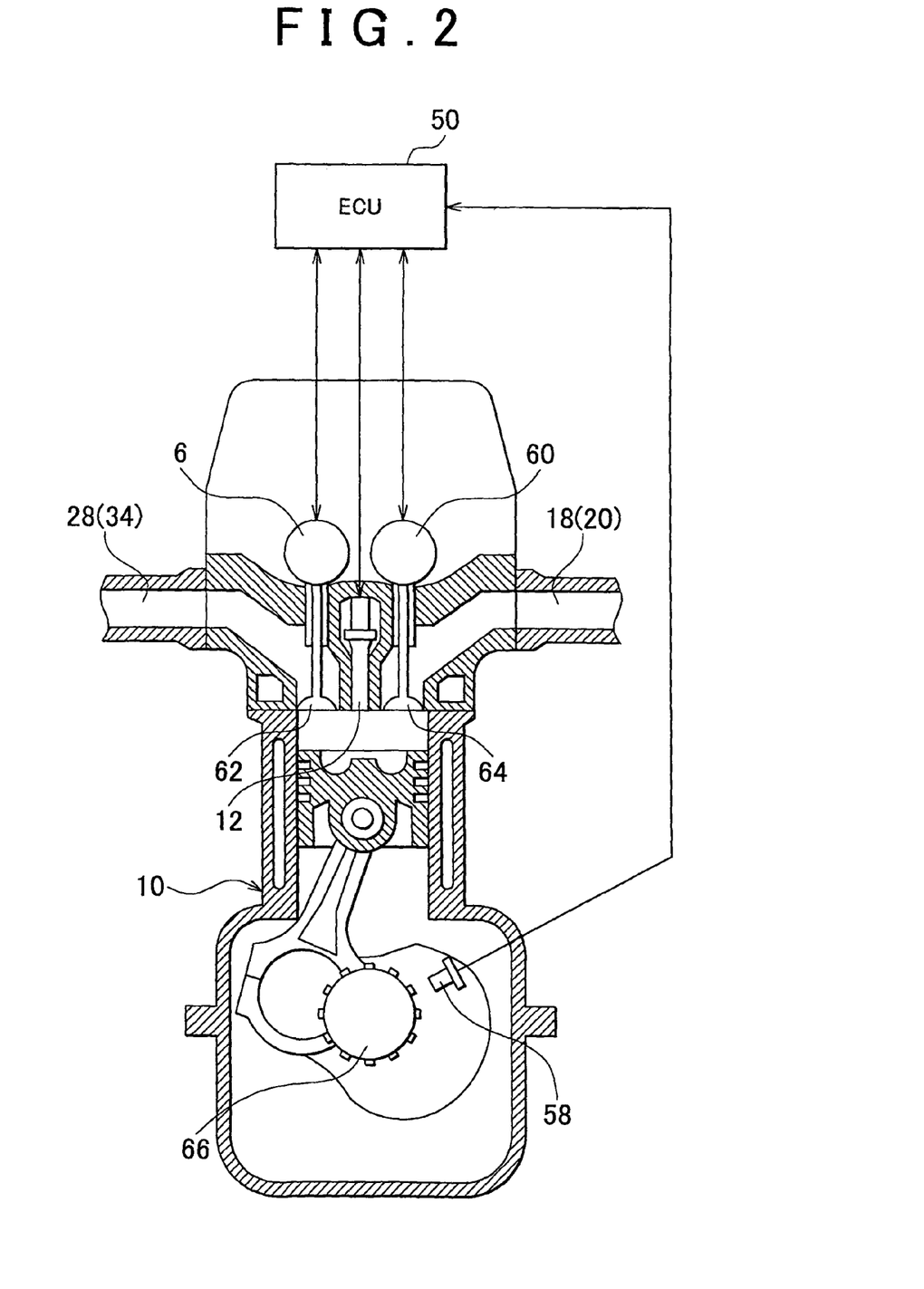
FIG. 2 is a cross sectional view showing one cylinder of a diesel engine in the system shown in FIG. 1.

FIG. 2 is a cross sectional view showing one cylinder of the diesel engine 10 shown in FIG. 1. Hereinafter, the diesel engine 10 will be described in more detail. As shown in FIG. 2, the diesel engine 10 includes a variable valve operating device 60 that changes valve timings (opening and closing timings) of an intake valve 62 and an exhaust valve 64 continuously or in a stepwise manner. The variable valve operating device 60 includes a phase change mechanism and a duration change mechanism. The phase change mechanism changes phases of the valve timings (opening and closing timings), that is, phase angles of a camshaft (not shown) with respect to a crankshaft 66. The duration change mechanism changes a lift and a duration of the valve.

For example, the phase change mechanism advances or retards the phases of the camshaft with respect to the crankshaft 66 using a hydraulic pressure. The duration change mechanism includes an oscillation member that transmits the rotational movement of the camshaft to the valve to lift the valve. Thus, by changing a position of the oscillation member, it is possible to increase or decrease the duration of the valve, while maintaining the opening timing of the valve at a substantially constant value. The position of the oscillation member is controlled using a rotational angle of a control shaft (not shown) provided in parallel with the camshaft. The rotation of the control shaft may be controlled using an actuator such as a motor. The configuration, the function, and the like of the variable-valve operating device 60 are a known technology, and do not constitute the main portion of the invention, and therefore, the detailed description thereof is omitted.

A crank angle sensor 58, which detects a rotational angle (crank angle) of the crankshaft 66, is provided close to the crankshaft 66 of the diesel engine 10. The variable valve operating device 60 and the crank angle sensor 58 are connected to the ECU 50.

[Operations in the first embodiment] (Control of internal EGR) In the diesel engine 10 according to the first embodiment, an EGR control is executed to return part of the exhaust gas into the cylinder. When the EGR control is executed, the amount of $CO_2$ with a high specific heat is increased in an air-fuel mixture, and therefore, an in-cylinder temperature at the time of combustion is decreased. This reduces the amount of generated NOx. However, because a concentration of $O_2$ is decreased, a concentration of smoke and an amount of discharged HC are increased when the diesel engine 10 is in a high load operating state, and thus, the amount of air is not sufficient. Therefore, the EGR control is executed only when the diesel engine 10 is in a low-to-medium load operating state. Also, it is important to accurately control the amount of the EGR gas (an EGR rate), to sufficiently provide the effect of the EGR.

An internal EGR control is executed so that the exhaust gas (burned gas) used for combustion in the cylinder remains in the cylinder, or is sucked back into the cylinder. More specifically, the internal EGR control is executed so that when the intake valve is opened before the exhaust valve is completely closed, and therefore, both of the intake valve and the exhaust valve are open, that is, during a valve overlap period, the exhaust gas (burned gas) is sucked back into the cylinder and the intake port. Then, the exhaust gas, which is sucked back, flows into the cylinder along with new air, when a piston is moved. An amount of internal EGR gas increases, as the valve overlap period increases. Therefore, it is possible to increase the amount of the internal EGR gas, by advancing the opening timing of the intake valve 62 (hereinafter, referred to as "intake-valve opening timing") using the variable valve operating device 60, thereby increasing the valve overlap period. Hereinafter, the control that advances the intake-valve opening timing will be referred to as "intake-valve opening timing advancing control".

In the system according to the first embodiment, the ECU 50 stores in advance a map indicating a relation between the operating state of the diesel engine 10 and the intake-valve opening timing at which the amount of the internal EGR gas is equal to an appropriate amount corresponding to the operating state of the diesel engine 10. The map is made by a fitting process. The ECU 50 executes a feed-forward control of the amount of the internal EGR gas by operating the phase change mechanism of the variable valve operating device 60 based on the map, according to the operating state of the diesel engine 10, thereby controlling the valve timings of the intake valve 62 (i.e., the valve overlap period).

[Control of external EGR] The external EGR control is executed to return part of the exhaust gas (burned gas) to the intake passage 28 through the EGR passage 40. More specifically, the exhaust gas is introduced into the EGR passage 40, by adjusting the opening amount of the EGR valve 44 according to the operating state of the diesel engine 10. The exhaust gas, which is introduced into the EGR passage 40, is cooled by an EGR cooler 42, and then returned to the intake passage 28.

The amount of the external EGR gas is controlled based on the concentration of oxygen in gas taken into the cylinder (hereinafter, the concentration will be referred to as intake air $O_2$ concentration). That is, the intake air $O_2$ concentration is correlated with the EGR rate. The intake air $O_2$ concentration can be estimated based on the intake air amount detected by the airflow meter 52, the opening amount of the EGR valve 44, the intake pressure (charging pressure) detected by the intake air pressure sensor 54, the back pressure detected by the back pressure sensor 56, and the like. Accordingly, an estimate value of the intake air $O_2$ concentration is calculated based on the above-described values, and the opening amount of the EGR valve 44 is controlled so that the estimate value becomes equal to a target value corresponding to the operating state. Thus, the external EGR gas is controlled so that the EGR rate becomes equal to a target EGR rate.

In the system according to the first embodiment, the ECU 50 stores in advance a map indicating a relation between the operating state of the diesel engine 10 and the intake air $O_2$ concentration at which the EGR rate is equal to an appropriate EGR rate corresponding to the operating state. The ECU 50 executes a feedback control of the opening amount of the EGR valve 44 so that the estimated intake air $O_2$ concentration becomes equal to the target value set according to the map.

(Control of actual compression ratio) As described above, the EGR control is executed for the diesel engine 10 according to the first embodiment to reduce the amount of discharged NOx when the diesel engine 10 is in a low-to-medium load operating state. When the EGR control is executed, a ratio among components in the air-fuel mixture is changed. Therefore, the actual compression ratio needs to be changed according to the change in the ratio among the components in the air-fuel mixture. More specifically, when the amount of the EGR gas is increased, the amount of $CO_2$ with a high specific heat is increased, and therefore, the in-cylinder temperature is decreased. Accordingly, a control that increases the actual compression ratio is executed.

The actual compression ratio is adjusted by changing the closing timing of the intake valve 62 (hereinafter, referred to as "intake-valve closing timing"). More specifically, the actual compression ratio is increased by advancing the intake-valve closing timing. In the system according to the first embodiment, the ECU 50 stores in advance a map indicating a relation between a target compression ratio, and a target value of the intake-valve closing timing, at which the actual compression ratio is equal to the target value. The map is made by a fitting process. The ECU 50 executes controls that drive the variable valve operating device 60 so that the intake-valve closing timing becomes equal to the target value set based on the map.

(Control for the variable valve operating device) It is possible to control the intake-valve opening timing and the intake-valve closing timing separately, using the variable valve operating device 60 according to the first embodiment, by executing controls that drive the phase change mechanism and the duration change mechanism. More specifically, when the phase change mechanism of the variable valve operating device 60 is driven, the phases of the valve timings are advanced or retarded while the valve duration is maintained at a constant value. Therefore, the intake-valve opening timing and the intake-valve closing timing are advanced or retarded by the same amount. When the duration change mechanism of the variable valve operating device 60 is driven, the valve duration is increased or decreased while the intake-valve opening timing is maintained at a substantially constant value. Therefore, only the intake-valve closing timing is advanced or retarded. Accordingly, a phase change amount, by which the phases need to be changed by the phase change mechanism, is determined based on a relation between the phase change amount and the intake-valve closing timing. A duration change amount, by which the duration needs to be changed by the duration change mechanism, is determined based on a relation between the duration change amount and the intake-valve opening timing, taking into account the phase change amount.

[Characteristic operations in the first embodiment] Next, characteristic operations in the first embodiment will be described with reference to FIG. 3 and FIG. 4. When the operating state of the diesel engine 10 is changed to a low-to-medium load operating state due to, for example, a demand for deceleration made in a vehicle, the EGR gas amount increase control that increases the amount of the EGR gas is executed to reduce the amount of NOx. More specifically, the intake-valve opening timing advancing control is executed to increase the amount of the internal EGR gas, and the control of the opening amount of the EGR valve 44 is executed to increase the amount of the external EGR gas. Also, an intake-valve closing timing advancing control is executed to increase the actual compression ratio of the diesel engine 10 according to the increase in the amount of the EGR gas.

Figure 3:
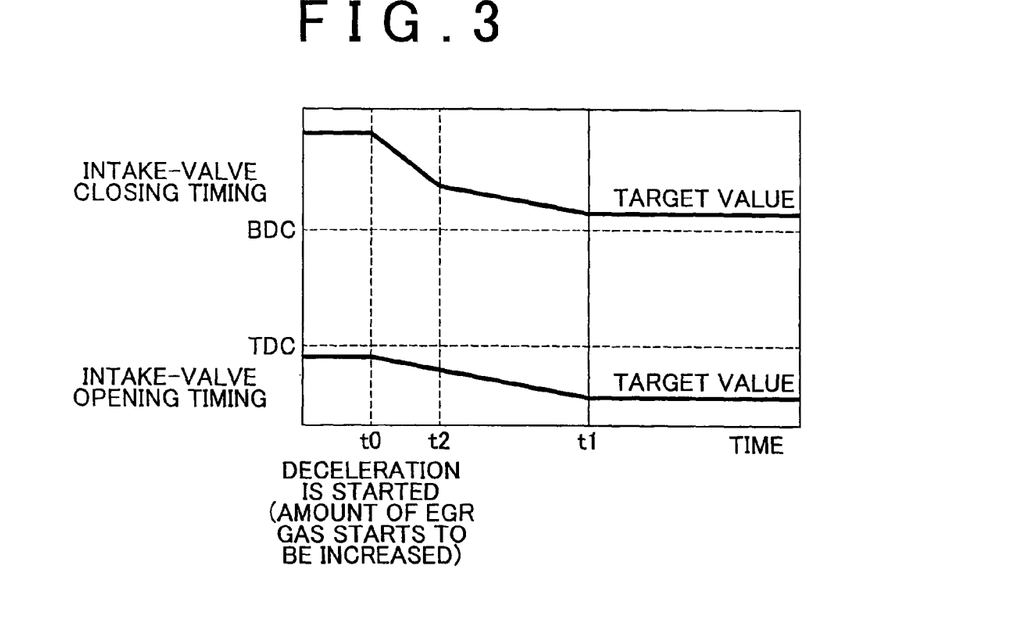
FIG. 3 is a timing chart showing changes in valve timings of an intake valve, when an amount of EGR gas is increased.
Figure 4:
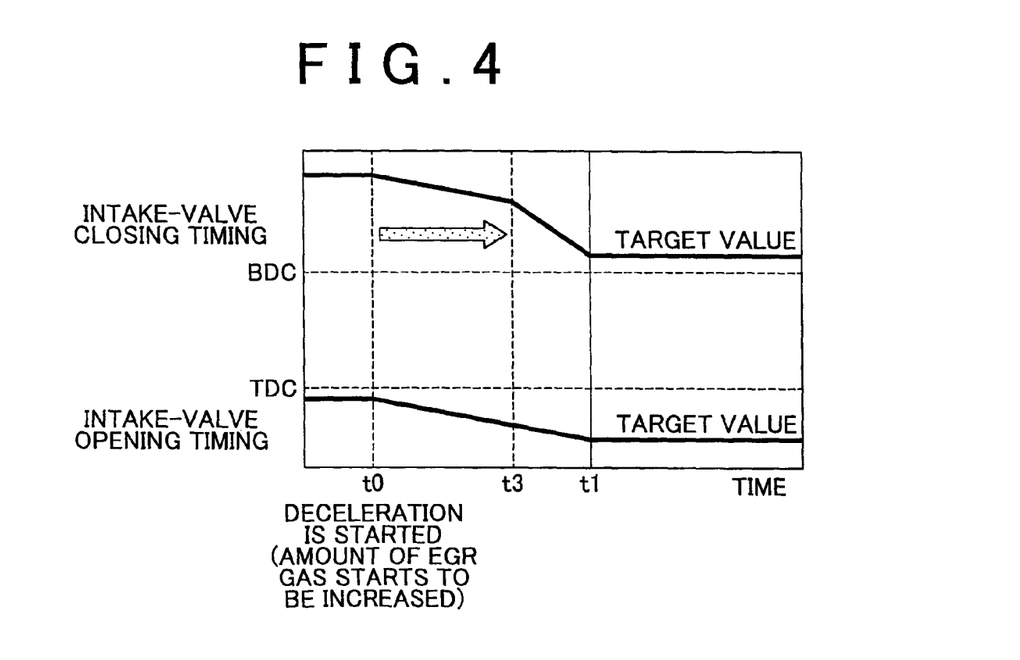
FIG. 4 is a timing chart showing changes in the valve timings of the intake valve, when the amount of the EGR gas is increased.

FIG. 3 is a timing chart showing the intake-valve opening timing and the intake-valve closing timing when the operating state of the diesel engine 10 is changed to the low-tomedium load operating state. As shown in FIG. 3, when the demand for deceleration is made in the vehicle, that is, the demand for increasing the amount of the EGR gas is made, the intake-valve opening timing advancing control and the intake-valve closing timing advancing control are executed. More specifically, in the intake-valve opening timing advancing control, the intake-valve opening timing is advanced during a period from time point t0 to time point t1 and reaches a target value at time point t1, by executing a phase advancing control using the phase change mechanism. Thus, the amount of the internal EGR gas is increased to a target value. In the intake-valve closing timing advancing control, the intake-valve closing timing is advanced to a target value, by executing the phase advancing control using the phase change mechanism, and executing a duration decrease control using the duration change mechanism.

As shown in FIG. 3, when the duration change mechanism performs the operation during a period from time point t0 to time point t2, which is shorter than the period from time point t0 to time point t1, the intake-valve closing timing is sharply advanced immediately after the intake-valve closing timing advancing control is started. Therefore, before the amount of the internal EGR gas is increased to the desired target value, the actual compression ratio may be increased, and NOx is likely to be discharged. This phenomenon may noticeably occur when the response of the duration change mechanism to the control is faster than the response of the phase change mechanism to the control.

Accordingly, in the first embodiment, a timing at which the operation performed by the duration change mechanism is completed in the intake-valve closing timing advancing control substantially matches a timing at which the intake-valve opening timing advancing control is completed. FIG. 4 is a timing chart showing the intake-valve opening timing and the intake-valve closing timing when the operating state of the diesel engine 10 is changed to the low-to-medium load operating state. As shown in FIG. 4, when the intake-valve opening timing advancing control is executed during the period from time point t0 to time point t1, the duration change mechanism performs the operation during a period from time point t3 to time point t1 in the intake-valve closing timing advancing control. The time point t3 is set so that the operation performed by the duration change mechanism is completed at time point t1. Thus, the actual compression ratio is increased only during the period immediately before the controls are completed. Therefore, it is possible to effectively avoid the situation where the actual compression is increased during a period in which the amount of the internal EGR gas is insufficient. This suppresses the discharge of NOx.

Figure 5:
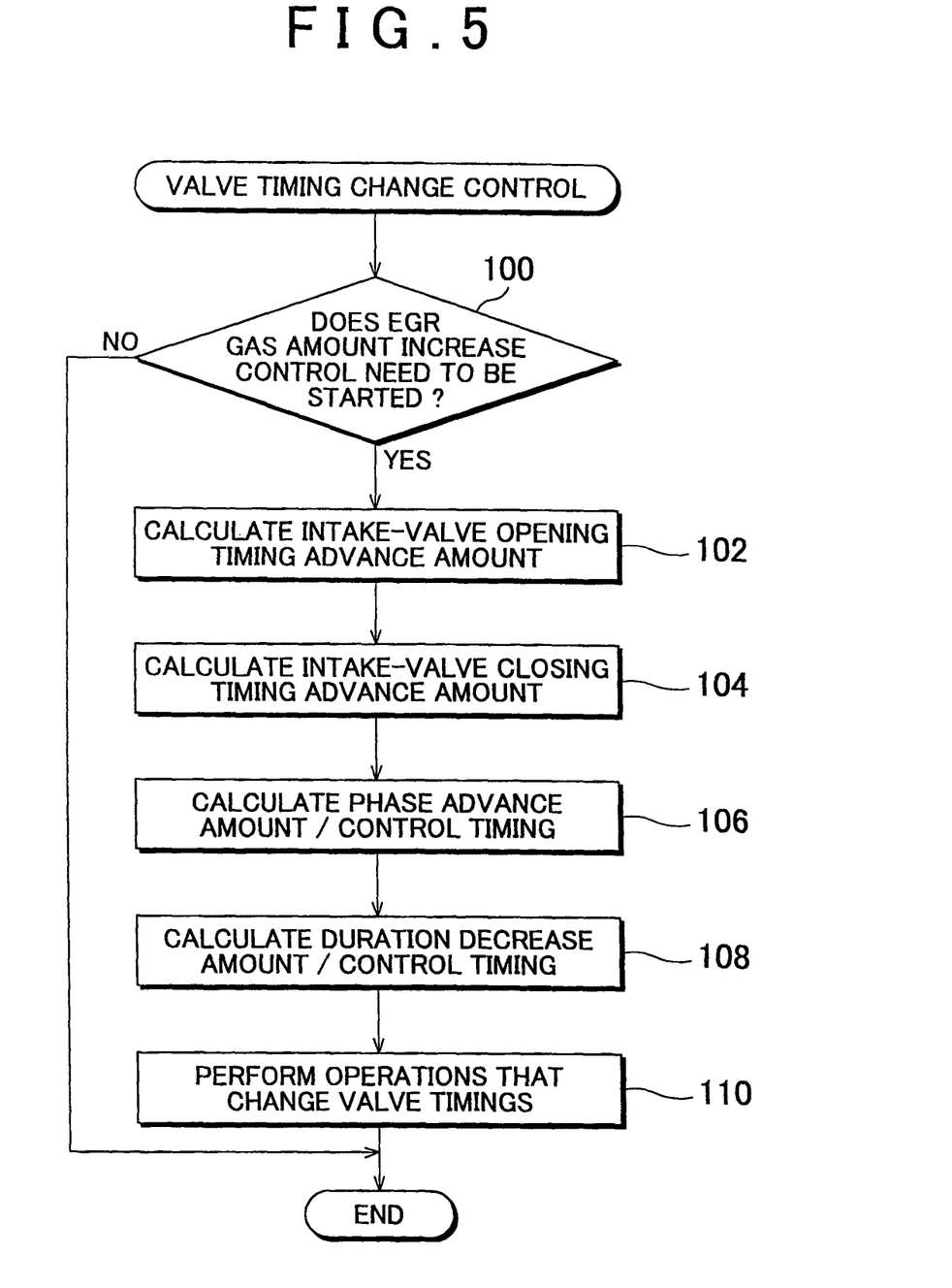
FIG. 5 is a flowchart of a routine executed in a first embodiment of the invention.

[Specific routine in the first embodiment] Next, a specific routine executed in the first embodiment will be described with reference to FIG. 5. FIG. 5 is a flowchart of the routine in which the ECU 50 executes controls that change the valve timings of the intake valve 62.

In the routine shown in FIG. 5, first, it is determined whether the EGR gas amount increase control that increases the amount of the EGR gas needs to be started for the diesel engine 10 (step 100). More specifically, it is determined whether the operating state of the diesel engine 10 is changed to the low-to-medium load operating state, based on the operating state of the diesel engine 10. When it is determined that the EGR gas amount increase control does not need to be started, the routine immediately ends.

When it is determined that the EGR gas amount increase control needs to be started in step 100, it is determined that the controls that change the valve timings of the intake valve 62 need to be executed. Thus, the routine proceeds to a next step, and an intake-valve opening timing advance amount, by which the opening timing of the intake valve 62 needs to be advanced, is calculated (step 102). More specifically, the intake-valve opening timing advance amount, by which the intake-valve opening timing needs to be advanced to introduce a desired amount of the internal EGR gas, is determined based on the operating state of the diesel engine 10, using the map. Next, an intake-valve closing timing advance amount, by which the closing timing of the intake valve 62 needs to be advanced, is calculated (step 104). More specifically, the intake-valve closing timing advance amount, by which the intake-valve closing timing needs to be advanced to make the actual compression ratio equal to a desired compression ratio corresponding to the amount of the EGR gas, is determined based on the operating state of the diesel engine 10, using the map.

Next, a controlled variable and a control timing for the phase change mechanism of the variable valve operating device 60 are calculated (step 106). The intake-valve opening timing advance amount is constituted only by the phase advance amount by which the phases are advanced. More specifically, the phase advance amount and the timing at which the phase change mechanism performs the operation are calculated to advance the intake-valve opening timing by the intake-valve opening timing advance amount calculated in step 102.

Next, controlled variables and a control timing for the duration change mechanism of the variable valve operating device 60 are calculated (step 108). The intake-valve closing timing advance amount is equal to a sum of the phase advance amount and a duration advance amount by which the duration is decreased. More specifically, the duration decrease amount is calculated to advance the intake-valve closing timing by the desired intake-valve closing timing advance amount, based on the intake-valve closing timing advance amount calculated in step 104 and the phase advance amount calculated in step 106. Also, a timing at which the control for the duration change mechanism is started is determined so that the timing at which the operation performed by the duration change mechanism is completed substantially matches the timing at which the operation performed by the phase change mechanism is completed.

Next, operations that change the valve timings are performed (step 110). More specifically, the control that drives the phase change mechanism is executed based on the phase advance amount and the control timing for the phase change mechanism, which are determined in step 106. Also, the control that drives the duration change mechanism is executed based on the duration decrease amount and the control timing for the duration change mechanism, which are determined in step 108.

As described above, in the system according to the first embodiment, when the intake-valve opening timing advancing control and the intake-valve closing timing advancing control are executed to increase the amount of the EGR gas, the actual compression ratio is increased only in the period immediately before the controls are completed. This avoids the situation where the actual compression ratio is excessively increased, and therefore, the amount of discharged NOx is increased during the period in which the amount of the internal EGR gas is insufficient, that is, during the period in which intake-valve opening timing advancing control is executed.

In the first embodiment, the invention is applied to the variable valve operating device 60 in which the response of the duration change mechanism to the control is faster than the response of the phase change mechanism to the control.

However, the response of the duration change mechanism to the control need not necessarily be faster than the response of the phase change mechanism to the control. That is, as long as a period required to drive the duration change mechanism in the intake-valve closing timing advancing control is shorter than a period required to drive the phase change mechanism, it is possible to delay the timing at which the duration change mechanism starts the operation.

In the first embodiment, in the intake-valve closing timing advancing control, the timing at which the control using the duration change mechanism is completed substantially matches the timing at which the control using the phase change mechanism is completed. However, the control timing for the duration change mechanism is not limited to this timing. That is, as long as the timing at which the control using the duration change mechanism is started is later than the timing at which the control using the phase change mechanism is started, it is possible to suppress an increase in the actual compression ratio during the period in which the amount of the EGR gas is insufficient.

In the first embodiment, the phase change mechanism of the variable valve operating device 60 may be regarded as "the phase change means" in the first aspect. The duration change mechanism of the variable valve operating device 60 may be regarded as "the duration change means" in the first aspect. When the ECU 50 executes the control so that the phase change mechanism performs the timing advancing operation in the process in step 110, "the intake-valve closing timing advancing means" in the first aspect may be implemented. More specifically, when the ECU 50 executes the control so that the phase change mechanism performs the operation in the process in step 110, "the first operation" in the first aspect may be implemented. When the ECU 50 executes the control so that the duration change mechanism performs the operation in the process in step 110, "the second operation" in the first aspect may be implemented.

In the first embodiment, when the ECU 50 executes the control so that the phase change mechanism performs the operation in the process in step 110, "the intake-valve opening timing advancing means" in the first aspect may be implemented.

Second Embodiment

Characteristics of a Second Embodiment

Next, a second embodiment of the invention will be described with reference to FIG. 6 and FIG. 7. When the ECU 50 executes a routine shown in FIG. 7 (described below) using the hardware configuration shown in FIG. 1, the second embodiment may be implemented.

In the first embodiment, in the intake-valve closing timing advancing control executed when the demand for increasing the amount of the EGR gas is made, the timing at which the duration change mechanism performs the timing advancing operation is later than the timing at which the phase change mechanism performs the timing advancing operation. This avoids the situation where the actual compression ratio is excessively increased, and the amount of discharged NOx is increased, during the period in which the amount of the internal EGR gas is insufficient, that is, during the period in which the intake-valve opening timing advancing control is executed. As described above, the duration change mechanism can be operated independently of the phase change mechanism. Thus, it is possible to further suppress an increase in the actual compression ratio, by executing a control that increases the duration to retard the intake-valve closing timing (hereinafter, the control will be referred to as "intake-valve closing timing retarding control"), during the period in which the amount of the internal EGR gas is insufficient.

Figure 6:
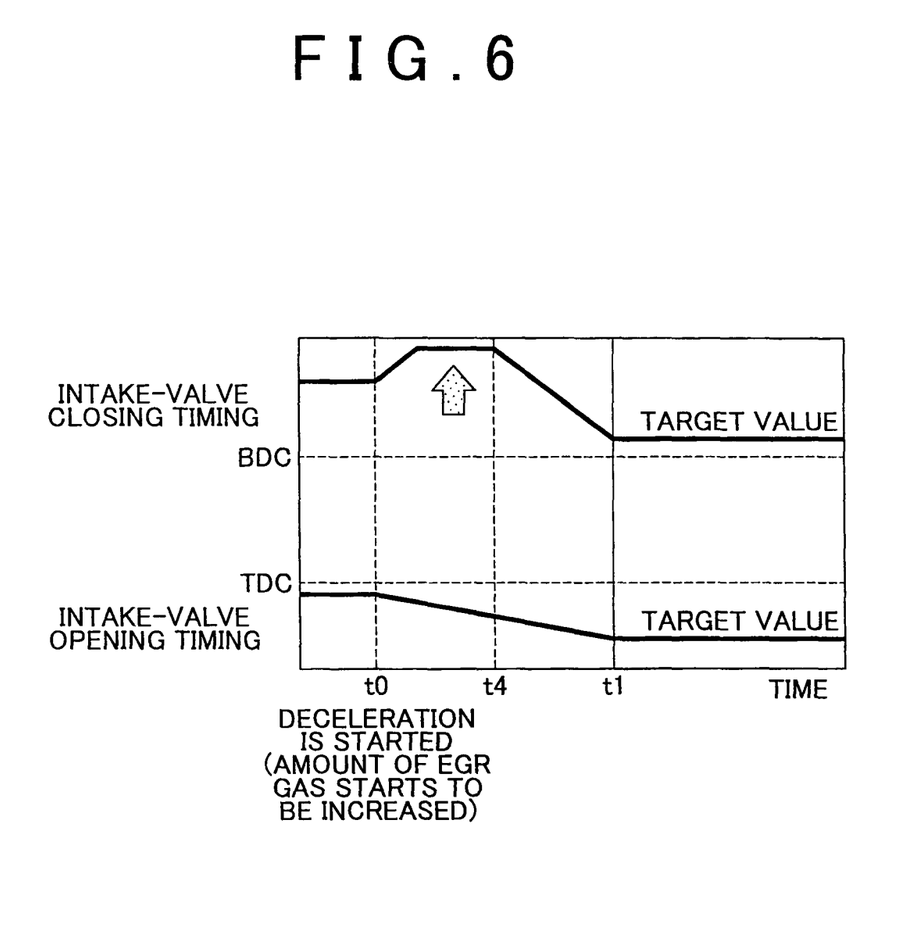
FIG. 6 is a timing chart showing changes in the valve timings of the intake valve, when the amount of the EGR gas is increased.

FIG. 6 is a timing chart showing the intake-valve opening timing and the intake-valve closing timing when the operating state of the diesel engine 10 is changed to the low-to-medium load operating state. As shown in FIG. 6, when the intake-valve opening timing advancing control is executed according to the demand for increasing the amount of the internal EGR gas during a period from time point t0 to time point t1, the intake-valve closing timing retarding control is executed during a period from time point t0 to time point t4. More specifically, the control is executed so that an intake-valve closing timing retard amount, by which the intake-valve closing timing is retarded by the duration change mechanism, becomes larger than the intake-valve closing timing advance amount by which the intake-valve closing timing is advanced by the phase change mechanism. The time point t4 is set to a value in a range in which the intake-valve closing timing can be advanced to the target value at time point t1. Therefore, it is possible to effectively suppress an increase in the actual compression ratio during the period from time point t0 to time point t4. This avoids the situation where the actual compression ratio is excessively increased, and the amount of discharged NOx is increased during the period. After the intake-valve closing timing retarding control is executed, the intake-valve closing timing advancing control is executed until the intake-valve closing timing is advanced to the desired timing.

[Specific routine in the second embodiment] Next, a specific routine executed in the second embodiment will be described with reference to FIG. 7. FIG. 7 is a flowchart of the routine in which the ECU 50 executes controls that change the valve timings of the intake valve 62.

Figure 7:
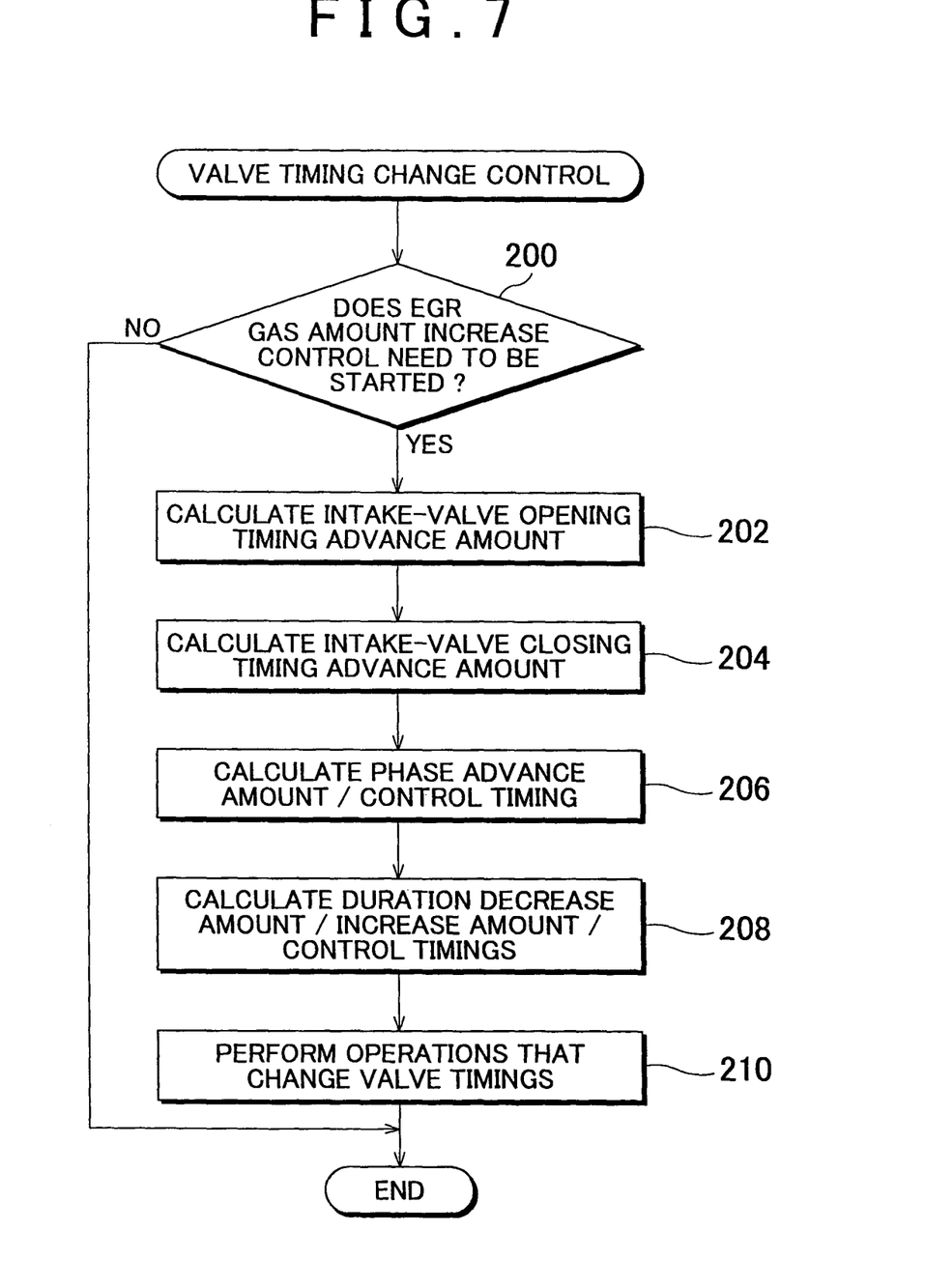
FIG. 7 is a flowchart of a routine executed in a second embodiment of the invention.

In the routine shown in FIG. 7, first, it is determined whether the EGR gas amount increase control that increases the amount of the EGR gas needs to be started for the diesel engine 10 (step 200). More specifically, the same process as that in step 100 is executed. When it is determined that the EGR gas amount increase control does not need to be started, the routine immediately ends.

When it is determined that the EGR gas amount increase control needs to be started in step 200, it is determined that the controls that change the valve timings of the intake valve 62 need to be executed. Thus, the routine proceeds to a next step, and the intake-valve opening timing advance amount, by which the opening timing of the intake valve 62 needs to be advanced, is calculated (step 202). Next, the intake-valve closing timing advance amount, by which the closing timing of the intake valve 62 needs to be advanced, is calculated (step 204). Next, the controlled variable and the control timing for the phase change mechanism of the variable valve operating device 60 are calculated (step 206). More specifically, the same processes as those in steps 102 to 106 in the flowchart shown in FIG. 5 are executed.

The controlled variables and the control timing for the duration change mechanism of the variable valve operating device 60 are calculated (step 208). The intake-valve closing timing is changed taking into account the phase advance amount. More specifically, based on the phase advance amount calculated in step 206 and the intake-valve closing timing advance amount calculated in step 204, a duration increase amount by which the duration needs to be increased by the intake-valve closing timing retarding control, a duration decrease amount by which the duration needs to be decreased by the intake-valve closing timing advancing control executed thereafter, and the control timings (i.e., the timings at which the controls are executed) are calculated. The timing at which the control for the duration change mechanism is started is determined so that the timing at which the operation performed by the duration change mechanism is completed substantially matches the timing at which the operation performed by the phase change mechanism is completed.

Next, the operations that change the valve timings are performed (step 210). More specifically, the control that drives the phase change mechanism is executed based on the phase advance amount and the control timing for the phase change mechanism, which are determined in step 206. Also, the control that drives the duration change mechanism is executed based on the duration increase amount, the duration decrease amount, and the control timings at which the intake-valve closing timing retarding control and the intake-valve closing timing advancing control are executed, which are determined in step 208.

As described above, in the system according to the second embodiment, when the intake-valve opening timing advancing control and the intake-valve closing timing advancing control are executed to increase the amount of the EGR gas, it is possible to decrease the actual compression ratio immediately after the intake-valve opening timing advancing control is started. This avoids the situation where the actual compression ratio is excessively increased, and therefore, the amount of discharged NOx is increased during the period in which the amount of the internal EGR gas is insufficient.

In the second embodiment, the invention is applied to the variable valve operating device 60 in which the response of the duration change mechanism to the control is faster than the response of the phase change mechanism to the control. However, the response of the duration change mechanism to the control need not necessarily be faster than the response of the phase change mechanism to the control. That is, as long as the intake-valve closing timing retarding control and the intake-valve closing timing advancing control are executed using the duration change mechanism during the period in which the intake-valve opening timing advancing control is executed using the phase change mechanism, it is possible to suppress the amount of discharged NOx during the period in which the amount of the internal EGR gas is insufficient.

In the second embodiment, the timing at which the intake-valve closing timing advancing control using the duration change mechanism is completed substantially matches the timing at which the intake-valve opening timing advancing control using the phase change mechanism is completed. However, the control timing for the duration change mechanism is not limited to this timing. The control timing for the duration change mechanism is set to a value in a range in which the discharge of NOx can be suppressed, based on a relation between the amount of the internal EGR gas and the actual compression ratio.

In the second embodiment, the phase change mechanism of the variable valve operating device 60 may be regarded as "the phase change means" in the first aspect. The duration change mechanism of the variable valve operating device 60 may be regarded as "the duration change means" in the first aspect. Also, when the ECU 50 executes the control so that the phase change mechanism performs the timing advancing operation in the process in step 210, "the intake-valve closing timing advancing means" in the first aspect may be implemented. More specifically, when the ECU 50 executes the control so that the phase change mechanism performs the operation in the process in step 210, "the first operation" in the first aspect may be implemented. When the ECU 50 executes the control so that the duration change mechanism performs the operation that decreases the duration in step 210, "the second operation" in the first aspect may be implemented.

In the second embodiment, when the ECU 50 executes the control so that the phase change mechanism performs the timing advancing operation in the process in step 210, "the intake-valve opening timing advancing means" in the first aspect may be implemented.

Also, in the second embodiment, when the ECU 50 executes the process in step S210, "the intake-valve closing timing advancing means" in the first aspect may be implemented. More specifically, when the ECU 50 executes the control so that the duration change means performs the operation that increases the duration in the process in step 210, "the third operation" in the first aspect may be implemented.

Third Embodiment

Characteristics of a Third Embodiment

Figure 8:
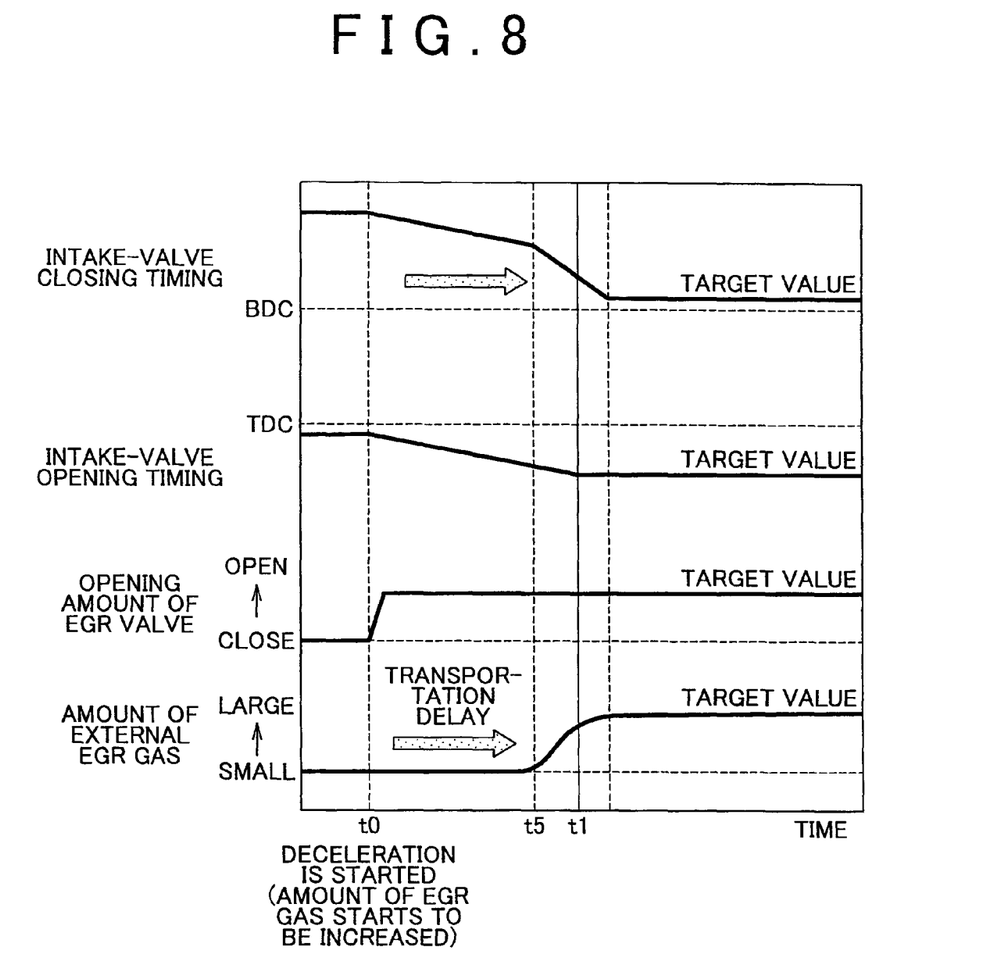
FIG. 8 is a timing chart showing changes in the valve timings of the intake valve, when the amount of the EGR gas is increased.

Next, a third embodiment of the invention will be described with reference to FIG. 8 and FIG. 9. When the ECU 50 executes a routine shown in FIG. 9 (described below) using the hardware configuration shown in FIG. 1, the third embodiment may be implemented.

In the first embodiment, in the intake-valve closing timing advancing control executed when a demand for increasing the amount of the EGR gas, the timing at which the timing advancing operation is performed by the duration change mechanism is later than the timing at which the timing advancing operation is performed by the phase change mechanism. This avoids the situation where the actual compression ratio is excessively increased, and therefore, the amount of discharged NOx is increased during the period in which the amount of the internal EGR gas is insufficient, that is, before the intake-valve opening timing advancing control is completed.

As described above, when the EGR gas amount increase control is executed, the external EGR gas is also introduced as well as the internal EGR gas. Because the external EGR control is executed to return part of the exhaust gas to the intake passage 28 through the EGR passage 40, there is a transportation delay period after the EGR valve 44 is opened, and before the external EGR gas is actually introduced into the cylinder. FIG. 8 is a timing chart showing the intake-valve opening timing, the intake-valve closing timing, and an external EGR rate, when the operating state of the diesel engine 10 is changed to the low-to-medium low operating state. As shown in FIG. 8, when a demand for increasing the amount of the EGR gas is made at time point t0, the intake-valve opening timing advancing control is executed to increase the amount of the internal EGR gas for the diesel engine 10. In addition, the feedback control for the EGR valve 44 is executed to increase the amount of the external EGR gas. Because there is the transportation delay period in which the external EGR gas is not actually introduced into the cylinder, the EGR rate is not increased immediately after the EGR valve 44 is opened. Therefore, if the intake-valve closing timing is greatly advanced during the transportation delay period, the actual compression ratio is increased although the external EGR gas has not introduced into the cylinder yet. As a result, the amount of discharged NOx is increased.

Accordingly, in the third embodiment, the timing of the intake-valve closing timing advancing control using the duration change mechanism is delayed, taking into account the transportation delay period. More specifically, as shown in FIG. 8, the duration change mechanism starts the operation in the intake-valve closing timing advancing control at the timing (time point t5 in FIG. 8) at which the external EGR gas starts to be introduced into the cylinder after the transportation delay period elapses. This effectively avoids the situation where the actual compression ratio is increased before the external EGR gas is actually introduced into the cylinder. Therefore, it is possible to effectively suppress the discharge of NOx.

[Specific routine in the third embodiment] Next, a specific routine executed in the third embodiment will be described with reference to FIG. 9. FIG. 9 is a flowchart of the routine in which the ECU 50 executes controls that change the valve timings of the intake valve 62.

Figure 9:
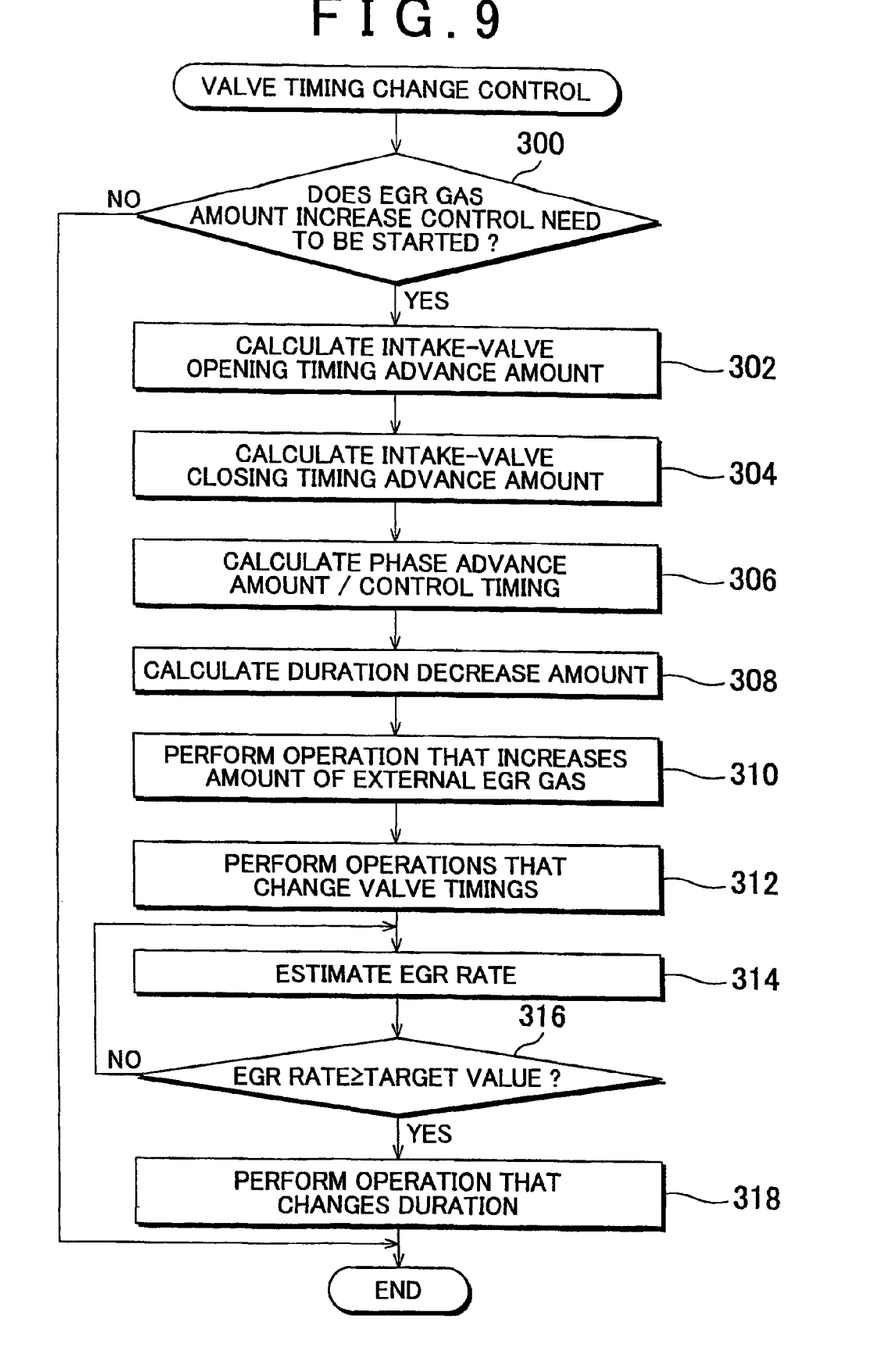
FIG. 9 is a flowchart of a routine executed in a third embodiment of the invention.

In the routine shown in FIG. 9, first, it is determined whether the EGR gas amount increase control that increases the amount of the EGR gas needs to be started for the diesel engine 10 (step 300). More specifically, the same process as that in step 100 in the flowchart shown in FIG. 5 is executed. When it is determined that the EGR gas amount increase control does not need to be started, the routine immediately ends.

When it is determined that the EGR gas amount increase control needs to be started in step 300, it is determined that the controls that change the valve timings of the intake valve 62 need to be executed. Thus, the routine proceeds to a next step, and the intake-valve opening timing advance amount, by which the opening timing of the intake valve 62 needs to be advanced, is calculated (step 302). Next, the intake-valve closing timing advance amount, by which the closing timing of the intake valve 62 needs to be advanced, is calculated (step 304). Next, the controlled variable and the control timing for the phase change mechanism of the variable valve operating device 60 are calculated (step 306). More specifically, the same steps as those in steps 102 to 106 in the flowchart shown in FIG. 5 are executed.

Next, the controlled variable for the duration change mechanism of the variable valve operating device 60 is calculated (step 308). More specifically, the duration decrease amount, by which the duration needs to be decreased by the duration change mechanism of the variable valve operating device 60, is calculated based on the intake-valve closing timing advance amount calculated in step 304, and the phase advance amount calculated in step 306.

Next, the control that increases the amount of the external EGR gas is executed (step 310). More specifically, the EGR valve 44 is controlled to be opened to introduce the external EGR gas into the EGR passage 40. Also, the operation that changes the phases is performed to change the valve timings (step 312). More specifically, the control that drives the phase change mechanism is executed based on the phase advance amount and the control timing for the phase change mechanism, which are determined in step 306.

Next, the EGR rate in the cylinder is estimated (step 314). More specifically, first, the intake air $O_2$ concentration is estimated. The intake air $O_2$ concentration is correlated with the EGR rate. Therefore, the current EGR rate in the cylinder is estimated based on the estimated intake air $O_2$ concentration. Next, it is determined whether the EGR rate is equal to or above a predetermined target value (step 316). More specifically, the actual EGR rate estimated in step 314 is compared with the predetermined target value. The predetermined target value is set as the EGR rate used to determine whether the transportation delay period has elapsed. When it is determined that the EGR rate is below the predetermined target value, the routine returns to step 314, and the EGR rate is estimated again.

When it is determined that the EGR rate is equal to or above the predetermined target value in step 316, it is determined that the transportation delay period has elapsed. Thus, the routine proceeds to a next step, and the operation that changes the duration is performed to change the valve timing (step 318). More specifically, the control that drives the duration change mechanism is executed based on the duration decrease amount determined in step 308.

As described above, in the system according to the third embodiment, when the intake-valve closing timing advancing control is executed to increase the amount of the EGR gas, the control that drives the duration change mechanism is executed after the transportation delay period elapses. This avoids the situation where the actual compression ratio is excessively increased during the period in which the amount of the EGR gas is insufficient. Therefore, it is possible to effectively suppress the discharge of NOx.

In the third embodiment, the control that drives the duration change mechanism is started at the timing at which the transportation delay period elapses. However, the control timing for the duration change mechanism is not limited to this timing. That is, for example, the timing at which the control for the duration change mechanism is completed may substantially match the timing at which the amount of the external EGR gas reaches the target value, as long as the control timing for the duration change mechanism is delayed according to the transportation delay period.

In the third embodiment, the external EGR rate is estimated based on the intake air $O_2$ concentration. However, the method of estimating the EGR rate is not limited to this method. Other known methods may be used to estimate the EGR rate. Also, in the third embodiment, the control timing for the duration change mechanism is determined based on the EGR rate. However, the value used to determine the control timing for the duration change mechanism is not limited to the EGR rate. That is, in addition to the EGR rate, a detected value or an estimated value of the amount of the EGR gas, or an amount correlated with the EGR rate or the amount of the EGR gas may be used to determine the control timing for the duration change mechanism.

In the third embodiment, the phase change mechanism of the variable valve operating device 60 may be regarded as "the phase change means" in the first aspect. The duration change mechanism of the variable valve operating device 60 may be regarded as "the duration change means". When the ECU 50 executes the control so that the phase change mechanism performs the timing advancing operation in the process in step 312 or 318, "the intake-valve closing timing advancing means" in the first aspect may be implemented. More specifically, when the ECU 50 executes the control so that the phase change mechanism performs the operation in the process in step 312, "the first operation" in the first aspect may be implemented. When the ECU 50 executes the control so that the duration change mechanism performs the duration decrease operation in the process in step 318, "the second operation" in the first aspect may be implemented.

In the third embodiment, when the ECU 50 executes the control so that the phase change mechanism performs the timing advancing operation in the process in step 312, "the intake-valve opening timing advancing means" in the first aspect may be implemented.

Also, in the third embodiment, when the ECU 50 executes the process in step 310, "the external EGR gas amount increase means" in the first aspect may be implemented.

Fourth Embodiment

Characteristics of a Fourth Embodiment

Next, a fourth embodiment of the invention will be described. In the third embodiment, when the intake-valve closing timing advancing control is executed to increase the amount of the EGR gas, the control that drives the duration change mechanism is executed after the transportation delay period elapses. This avoids the situation where the actual compression ratio is excessively increased during the transportation delay period, that is, during the period in which the amount of the EGR gas is insufficient. Therefore, it is possible to effectively suppress the discharge of NOx.

However, when the amount of the EGR gas is small, and the compression ratio is low, a large amount of HC is generated. Therefore, when an increase in the actual compression ratio is suppressed during the transportation delay period as in the third embodiment, the amount of discharged HC may be increased. Accordingly, in the fourth embodiment, a pilot injection amount is increased during the transportation delay period. When the amount of the EGR gas is small, smoke is unlikely to be generated by increasing the pilot injection amount. Therefore, it is possible to effectively suppress the discharge of HC, while suppressing the discharge of NOx during the period.

In the fourth embodiment, the pilot injection amount is increased during the transportation delay period, that is, during the period before the duration change mechanism performs the intake-valve closing timing advancing operation. However, the injection amount increase period, in which the pilot injection amount is increased, is not limited to this period. That is, the target value of the intake-valve closing timing may be set to another value, and the injection amount increase period may be set to a period in a range where the amount of the EGR gas is small, and therefore, generated smoke does not cause a problem. Also, the injection amount increase period may be set based on the amount of the EGR gas.

The invention claimed is:

1. A control apparatus for an internal combustion engine, comprising:
   an electronic control unit configured with executable program logic to perform:
   advancing or retarding phases of an opening timing and a closing timing of an intake valve;
   increasing or decreasing a duration of time that the intake valve is opened;
   increasing an amount of EGR gas, based on an operating state of an internal combustion engine; and
   advancing the closing timing of the intake valve when the amount of EGR gas is increased, by executing a first operation that advances the phases of the opening timing and the closing timing of the intake valve, and executing a second operation that decreases the duration of time the intake valve is opened;
   wherein the second operation is executed at a later timing than a timing at which the first operation is executed,
   wherein the second operation is executed at a time of intake-valve closing timing, so that the intake-valve is closed more quickly than when the second operation is executed at a time of intake-valve opening timing.

2. The control apparatus according to claim 1, wherein:
   the electronic control unit increases the amount of the EGR gas by advancing the opening timing of the intake valve; and
   a timing at which the second operation is completed substantially matches a timing at which the first operation is completed.

3. The control apparatus according to claim 1, further comprising an actuator and wherein the electronic control unit controls the actuator to increase or decrease the duration of time that the intake valve is opened.

4. The control apparatus according to claim 1, wherein the electronic control unit changes the duration of time that the intake valve is closed, while maintaining the opening timing of the intake valve at a substantially constant value.

5. The control apparatus according to claim 1, wherein the electronic control unit is configured with executable program logic to further perform a third operation that increases the duration of the valve closing timing, before the second operation is started.

6. The control apparatus according to claim 5, wherein the third operation is performed so that an amount by which the intake-valve closing timing is retarded is larger than an amount by which the intake-valve closing timing is advanced.

7. The control apparatus according to claim 1,
   further comprising an EGR passage that connects an exhaust passage for the internal combustion engine to an intake passage for the internal combustion engine, and wherein the electronic control unit increases an amount of external EGR gas that is returned from the exhaust passage to the intake passage through the EGR passage; and
   the electronic control unit starts the second operation, based on the amount of the EGR gas.

8. The control apparatus according to claim 7, wherein when a detected value or an estimated value of the amount of the EGR gas or an amount correlated with the amount of the EGR gas reaches a predetermined target value, the electronic control unit starts the second operation.

9. The control apparatus according to claim 7, wherein when an EGR rate in a cylinder reaches a predetermined target EGR rate, the electronic control unit starts the second operation.

10. The control apparatus according to claim 7, wherein
    the electronic control unit configured with the executable program logic further performs increasing a pilot injection amount during a period in which an amount by which the intake-valve closing timing is advanced is smaller than a predetermined value.

11. The control apparatus according to claim 10, wherein the pilot injection amount is increased during a period before the second operation starts.

12. The control apparatus according to claim 1, wherein the closing timing of the intake valve is advanced toward an intake bottom dead center.

13. A control method for an internal combustion engine that includes an electronic control unit configured with executable program logic for performing the steps of:
    increasing an amount of EGR gas, based on an operating state of an internal combustion engine;
    performing a first operation that advances a phase of a closing timing of an intake valve;
    performing a second operation that decreases a duration of time that the intake valve is opened, when an amount of EGR gas is increased; and
    controlling a timing at which the second operation is executed to be later than a timing at which the first operation is executed,
    wherein the second operation is executed at a time of intake-valve closing timing, so that the intake-valve is closed more quickly than when the second operation is executed at a time of intake-valve opening timing.

* * * * *